3,119,010
TIME CONTROLLED AUTOMATIC ARC
WELDING TOOL
Frank B. Kras, 206 Beverwyck Road, Lake Hiawatha, N.J., and Charles Wasserberg, 187 Forest Hill Road, West Orange, N.J.
Filed Nov. 2, 1961, Ser. No. 150,117
11 Claims. (Cl. 219—127)

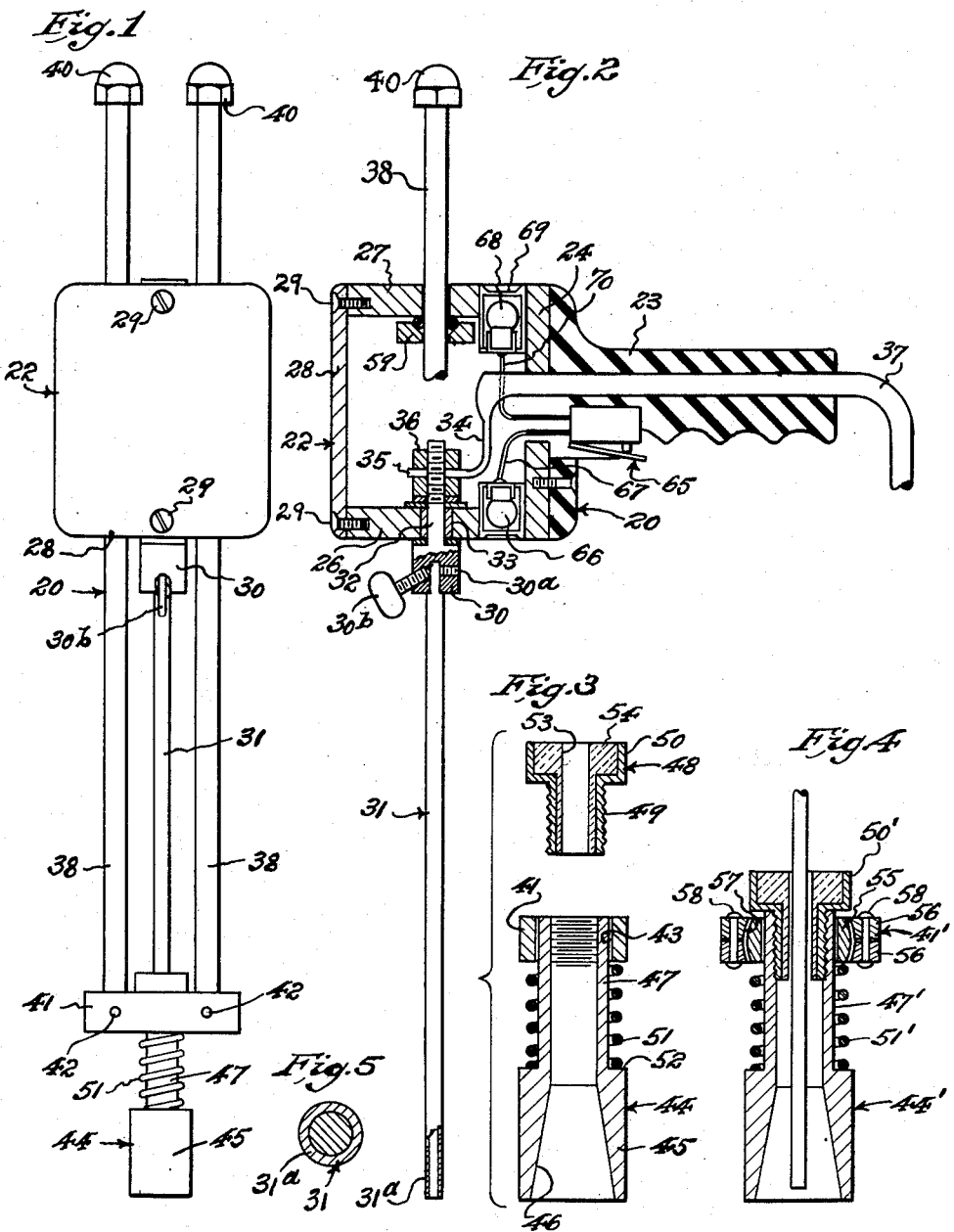

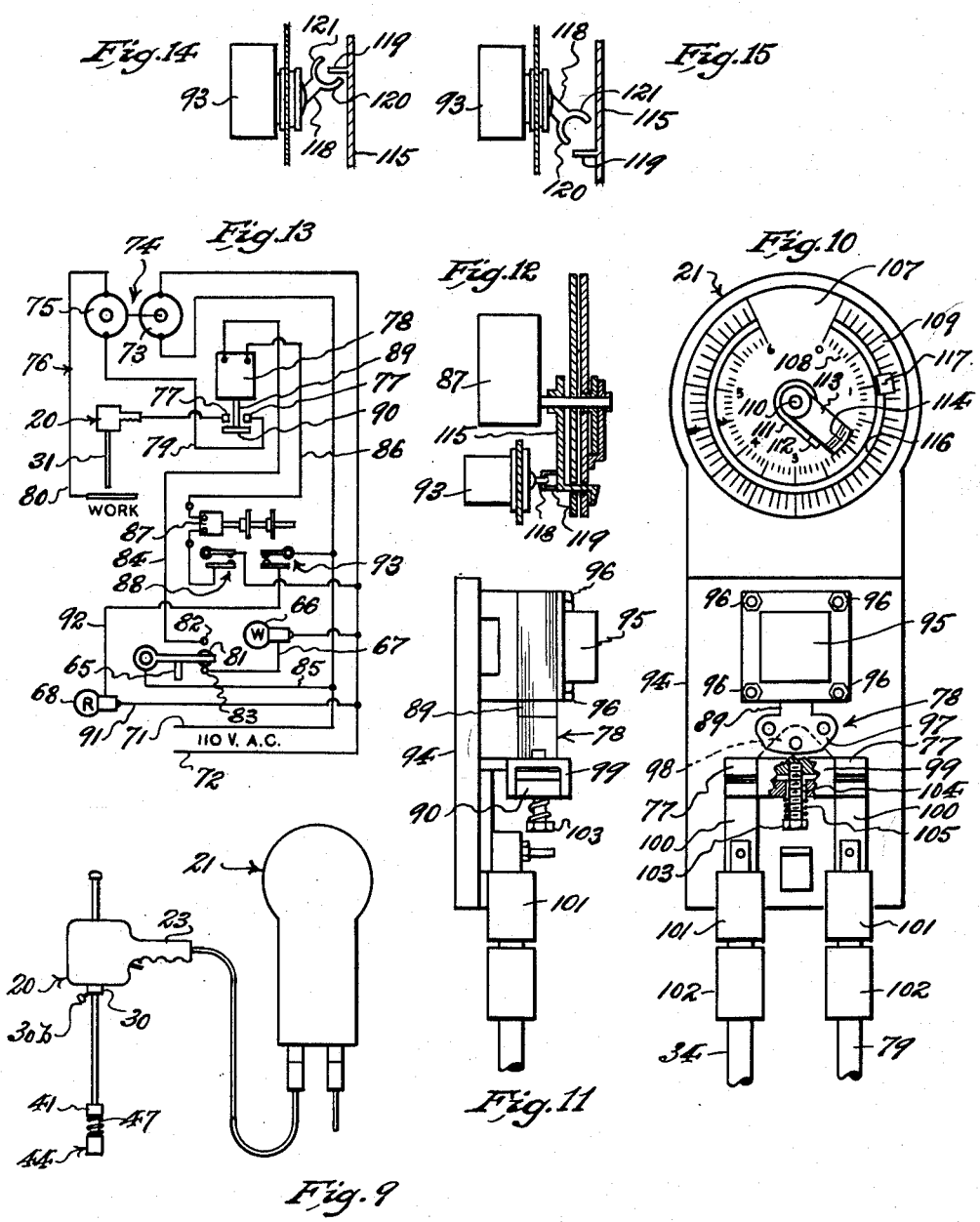

This invention relates to arc welding apparatus in general, and has particular reference to apparatus of this kind which includes a portable gun having a workpiece-contacting nose member and means to feed a welding rod toward the nose member into arcing relation during a forward-welding phase and to withdraw the rod in a back-welding phase.

In the employment of welding guns of the type just mentioned, it often becomes desirable to perform a series of welding operations of as closely identical form as possible, especially in spot-welding. Prior to our present invention, efforts to duplicate the form and character of an initial weld have been based on guesswork, i.e. the welder tries from memory to make each forward-welding phase and back-welding phase of just the same duration as the corresponding phases of each preceding weld, but even the most skillful welder cannot accomplish this performance with the precision to be desired.

It, therefore, is our primary object to provide a welding apparatus which takes advantage of the availability on the market of highly efficient mechanical timers by incorporating therein means to control the duration of time that electric arc producing current is applied to the welding rod at each welding operation and to warn the operator of the exact moment that the back-welding phase should be commenced.

As a result of our improvement in welding apparatus, any welder is enabled to produce a large number of welds of uniform quality with a minimum of skill, time and labor.

A further object is to provide a spring pressed hooded arc shield of tubular form which is mounted on a ball and socket joint to permit the operator to start arcing by tilting the arc shield while it is displaced rearwardly against the resistance of the spring to expose the tip of the welding rod.

In the prior art there are welding guns having workpiece-contacting nose members adjustably mounted on the handle-provided casing by means of parallel guide rods which are slidably engaged with guide holes in said casing. Various means have been provided in these prior art guns to brake the guide rods in adjusted positions, but they have an objectionable tendency to flex or bend the rods laterally. It, therefore, is an object of the present invention to provide novel braking means which exerts pressure on the guide rods equally around their circumferences and will not flex them.

Still further objects, advantages and features of the invention will become apparent as the following specific description is read in connection with the accompanying drawing, in which:

FIG. 1 is a top plan view of the welding gun alone;

FIG. 2 is a longitudinal vertical section of the same;

FIG. 3 is a large-scale exploded vertical section of the nose member alone;

FIG. 4 is a large-scale vertical section of a modified nose member, showing the welding rod assembled therewith and broken away;

FIG. 5 is a large scale cross-section of the welding rod;

FIG. 9 is a small-scale side elevational view of the completely assembled welding gun and automatic timing and switch unit;

FIG. 10 is a front elevation of the automatic timing and switch unit with cover removed;

FIG. 11 is a side elevation of the solenoid switch element thereof;

FIG. 12 is a fragmentary detail sectional view through the dial plate of the timer, showing the micro-switch for the warning indicator circuit;

FIG. 13 is a diagrammatic view of the combined circuits for the welding gun, timer, solenoid switch, trigger switch, warning indicator lamp, and workpiece illuminating lamp.

FIG. 14 is a fragmentary detail view showing the position of the lever of the warning indicator micro-switch after the operating arm of the timer is displaced by its turning movement;

FIG. 15 is a similar view showing the same switch lever restored to initial closed position by the action of the resetting timer means.

Figure 7:
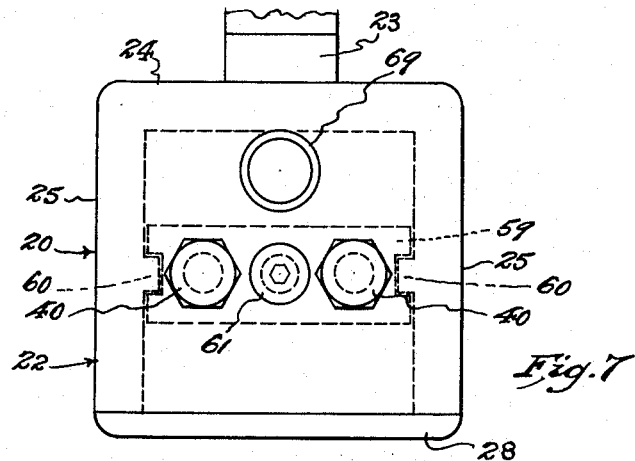
FIG. 7 is a rear elevaion of the same.

Referring now in detail to the drawings, wherein like reference characters designate corresponding parts in the several views, it will be observed that our invention comprises two cooperative assemblies or units, viz. the definitely portable welding gun 20, which must be guided by hand from spot to spot along the workpieces to be welded together, and the associated automatic timing and switch unit 21, which may be more or less remotely located in relation to welding gun 20 but, if close-coupled, must have a flexible connection with the latter. An illustrative embodiment of the portable welding gun 20 will be described first. (See FIGS. 1 to 8.)

Welding gun 20 includes a casing 22 having a handle 23 composed preferably of electrical insulation material to protect the welder against electric shock. Casing 22 may be of any desired construction, but we prefer to have it in the form of a box with integral bottom wall 24 and vertical side walls 25—25, front wall 26 and rear wall 27. The top of casing 22 is provided with a removable cover 28 secured to the vertical walls by suitable means such as screws 29.

A chuck 30 to replaceably mount a welding rod 31 in a position projecting horizontally forward from casing 22 has its shank 32 engaged within a bushing 33 of electric insulation material which penetrates front wall 26 of said casing in a manner to insulate chuck 30 from wall 26. Suitable means, such as radial setscrew 30a and diagonal inwardly biasing setscrew 30b may be used to secure welding rod 31 to chuck 30. Incidentally, a standard welding rod is coated with an armor which includes fine iron grains. During manufacture, the coating 31a is extended beyond the tip of rod 31 to provide a sleeve-like individual shield (FIG. 3) which is somewhat fragile and requires protective means to be described later herein. A flexible electric lead wire 34, which constitutes one branch of a welding circuit, enters through handle 23 into casing 22 and has an annular terminal 35 electrically connected to shank 32 of chuck 30 by means of nut 36. Lead wire 34 is sheathed in a heavy armor 37 of electrical insulation material.

A pair of horizontally level parallel guide rods 38—38 are longitudinally slidable through guide holes 39—39 (FIG. 6) provided in the respective front and rear walls 26 and 27 of casing 22. Stop nuts 40—40 are threaded onto the rear ends of guide rods 38—38 for contact with rear casing wall 27 to limit forward extension of said rods.

Guide rods 38—38 serve to support at varying distances in front of casing 22 a cross-head 41 to which their forward ends are rigidly and detachably secured in suitable manner as by set-screws 42. Cross-head 41 has a bore 43 of circular cross-section arranged concentric to the longitudinal axis of chuck 30 and welding rod 31.

A nose member 44 is supported by cross-head 41 in a position to contact one of the workpieces being welded in advance of the free tip of welding rod 31. This nose member 44 preferably is of cylindrical peripheral cross-section and is hollow in order that welding rod 31 may penetrate said nose member with the latter serving as an arc shield to protect the eyes of the welder and render use of cumbersome head-worn eye shields unnecessary.

Nose member 44 includes a forward body portion 45 that is exteriorly cylindrical in form and has a frusto-conical forwardly diverging bore 46. Extending rearward from body portion 45, nose member 44 has a tubular shank 47 of reduced external diameter that slidably extends through bore 43 of cross-head 41 (FIG. 3). The rear end of bore 43 is screwthreaded and a coupling member 48 of substantially T-shaped axial cross-section has its forwardly presented shank 49 similarly screwthreaded for detachable engagement with said screwthreaded bore. The enlarged head portion 50 of coupling member 48 is substantially equal in diameter to the vertical width of cross-head 41 in order that said coupling member may contact said cross-head to limit forward thrust of nose member 44 in its sliding engagement with cross-head 41. A compression spring 51 encircles shank 47 of nose member 44 in interposed relation to cross-head 41 and the shoulder 52 formed at the rear end of the body portion 45 of said nose member. Spring 51 tends to maintain the workpiece-contacting front face of nose member 44 sufficiently spaced from the free tip of welding rod 31 to prevent accidental premature arcing.

Coupling member 48 is provided with a central longitudinal bore 53 penerated by welding rod with sufficient clearance to prevent undesirable rubbing contact and provided with a lining 54 having heat resistant and electric insulation properties. Ceramic material is suitable for composition of lining 54.

To permit nose member 44 to sway or tilt slightly in its bearing engagement with cross-head 41 for a purpose which will be explained fully later herein, shank 47 of nose member 44 is provided with considerable clearance in bore 43 of said cross-head.

FIG. 4 discloses a modified nose member 44′, nearly all of whose structural elements are substantially identical with those shown in FIG. 3. The difference is in means to create a ball and socket joint between the shank 47′ of nose member 44′ and cross-head 41′. In this instance, a ball joint ring 55 is installed on the rear end portion of shank 47′ in interposed relation to head 50′ of coupling member 48′ and spring 51′, and cross-head 41′ is formed by a pair of substantially identical ring sections 56—56 which have concave inner socket-forming faces 57—57 conforming to the concave outer peripheral face of ball joint ring 55 and are in frictional contact therewith. Ring sections 56—56 of cross-head 41′ are secured together by suitable means, such as rivets 58. In general, the action in the modified nose member is the same as in the FIG. 3 embodiment, i.e. the desired sway or tilt is achieved, but danger of jamming during reciprocation is eliminated because sliding movement of shank 47′ in ball joint ring 55 is constantly rectilinear. The only deviation from rectilinear motion occurs in the ball and socket joint between rings 55 and 56.

Figure 8:
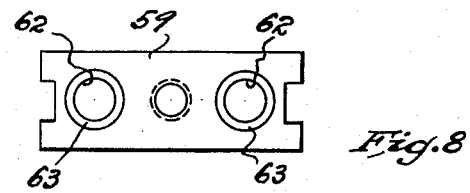
FIG. 8 is a similar view in axial section of the pressure bars of the braking means.
Figure 6:
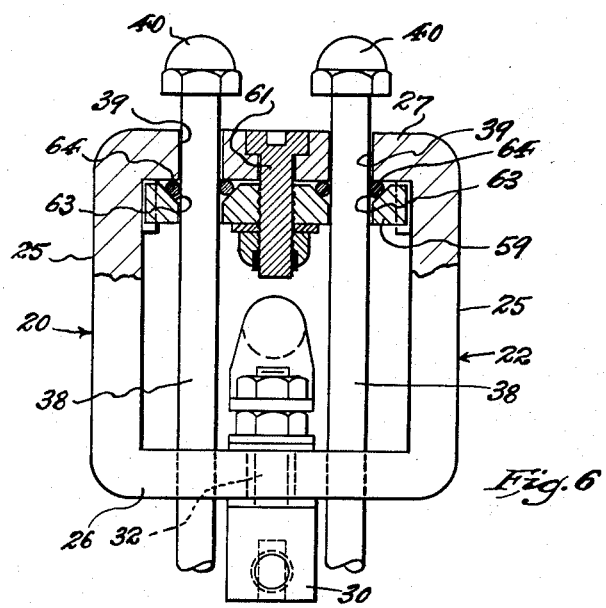
FIG. 6 is a large-scale horizontal cross-sectional view of the gun casing, partly broken away, showing the coordinated adjusting means for the guide rod braking mechanism.

FIGS. 6 to 8, inclusive, disclose braking means to resist sliding movement of guide rods 38—38 in the guide holes 39—39 of casing 22 of welding gun 20. The means disclosed constitute an improvement upon the braking means of similar prior art welding guns, which are of such construction that they exert braking pressure on the guide rods in one direction more than another and tend to deform the rods or to cause uneven wear. In accordance with the improvement, a horizontally elongated pressure bar 59 is slidably mounted on guides 60 in casing 22 closely adjacent to rear wall 27 for adjustment toward and away from said wall by means of a headed adjusting screw 61 that is rotatable in wall 27 and has screwthreaded engagement with pressure bar 59. The head of adjusting screw 61 is countersunk in rear casing wall 27 and is provided with a non-circular outwardly presented socket for engagement by a suitable turning tool (not shown). Pressure bar 59 has through holes 62—62 which are penetrated by guide rods 38—38 and the outer end portions of said holes are rearwardly flaring as at 63—63 to receive packing rings 64—64 of elastic material, such as rubber, Teflon, or the like. By rotational adjustment of screw 61, packing rings 64—64 may be wedged radially into varying degrees of braking pressure against guide rods 38—38. Due to this construction, braking pressure is applied to guide rods 38—38 equally in a radial direction against all sides of each of guide rods.

Before proceeding to description of automatic timing and switch unit 21, the remaining structural elements of welding gun 20 will be described (FIG. 2). In the first place, a micro-switch 65, or "trigger switch," as it may be called because of its functional purpose, is located on handle 23. This trigger switch 65 is connected in the electric circuits represented diagrammatically in FIG. 11 primarily to initiate closing of the welding circuit when it is pressed inwardly by the welder's finger. Secondly, an electric lamp 66 designed to cast a wide beam of white light on the workpieces to be welded is mounted in the front wall 26 of casing 22 and is connected in the circuit of trigger switch 65 in such a manner (FIG. 11) that the circuit 67 of lamp 66 will be closed when said trigger switch is open and will be opened automatically to extinguish the un-needed workpiece-illuminating beam when welding commences, as will be described more fully later herein. Finally, a warning indicator lamp 68 is located in rear wall 27 of casing 22 in a position to direct a beam of light externally through a window 69 of red glass. The circuit 70 of lamp 68 will be closed automatically by a timer device also to be described later at the instant that the back-welding phase should commence.

Referring next to the diagrammatic representation of electric circuits in FIG. 13, it will be observed that welding gun 20 is shown separated from the triggering circuit of trigger switch 65, although the latter switch is actually in practice located on the handle of the welding gun in order that the welder may close the switch when the tip of welding rod 31 has been placed in the desired contact with the workpiece. However, the general organization of essential functional elements is represented.

The opposite sides of an alternating current 110 volt supply circuit are indicated at 71—72. Because it is usually desired to employ direct current for energization of the welding circuit, supply circuit 71—72 is connected to the poles of an A.C. motor 73 of motor-generator set 74, the poles of whose D.C. generator component 75 are connected to normally open welding circuit 76, which includes lead wire 34 of welding gun 20 (see FIG. 2) is connected directly to one of the pair of stationary contact members 77—77 of a solenoid 78 to be described in detail presently. The other stationary contact member 77 of the pair is connected by conductor 79 to one pole of generator 75. The opposite pole of generator 75 is connected by lead wire 80 to the workpieces to be welded together.

Trigger switch 65 is a three-pole switch including a movable contact member 81 and two stationary contact members 82 and 83 constructed and arranged to be contacted alternately by said movable contact member. Stationary contact member 82 of trigger switch 65 is connected directly to one terminal of the magnetic field coil of solenoid 78 by conductor 84. The other stationary contact member 83 of trigger switch 65 is connected to one side of circuit 67 of workpiece-illuminating lamp 66 and the other side of said circuit is connected to side 72 of the A.C. supply circuit.

Movable contact member 81 of trigger switch 65 is connected by conductor 85 to side 71 of the A.C. supply circuit. Movable contact member 81 is spring-biased into its normal position shown in FIG. 11 wherein it is in contact with stationary contact member 83 and maintains the energizing circuit of lamp 66 closed to illuminate the workpieces.

The terminal of the magnetic field coil of solenoid 78 other than the one connected to conductor 84 is connected by conductor 86 to one terminal of a standard electrical timer 87 which is conventionally represented in FIG. 13. The opposite terminal of timer 87 is connected through a micro-switch 88, whose time duration in closed condition is controlled by said timer, to side 72 of the A.C. supply circuit. This means that solenoid 78 is energized by A.C. current.

Solenoid 78 has a reciprocating core plunger 89 attached to a contact cross-bar 90 in a manner to be described in detail presently, whereby, when said solenoid becomes energized, said contact cross-bar will be drawn into contact with both stationary contact members 77—77 to close the D.C. welding circuit for a time period determined at the will of the welder by pre-setting timer 87.

The circuit 70 of warning signal lamp 68 includes a conductor 91 connected directly to side 72 of the A.C. supply circuit and a conductor 92 connected to the opposite side 71 of said supply circuit through a micro-switch 93 which closes circuit 70 automatically after the welding circuit has been in closed condition for a predetermined fraction of its total duration through operation of timer 87.

Solenoid switch 78, shown in detail in FIGS. 10 and 11, includes a heavy base 94 of insulation material on which the solenoid magnetic field coil 95 is rigidly clamped by means of bolts 96. In the bore of field coil 95, the previously mentioned laminated core plunger 89 is mounted to reciprocate. This plunger 89 has a T-shaped outer head 97 which is pivotally connected to the V-shaped web 98 of a U-shaped coupling 99, which latter is pinned to contact cross-bar 90, also previously mentioned, which is intended to bridge stationary contact members 77—77 to close the welding circuit. Coupling 99 and contact cross-bar 90 are thus supported by, and movable with, core plunger 89. Stationary contact members 77—77 are mounted on the respective L-shaped metallic brackets 100—100 which are secured to base 94 and thus insulated one from the other. Terminal sockets 101—101 are secured to base 94 and electrically connected to the respective brackets 100—100 and their related stationary contact members 77—77. Terminal plugs 102 and 102 are fitted in terminal sockets 101—101 to electrically connect the respective conductors 34 and 79 of the welding circuit to stationary contact members 77—77.

When the solenoid magnetic field is energized, core plunger 89 is drawn inward to force contact cross-bar 90 into electrical contact with stationary contact members 77—77. In order to diminish the shock of this contacting engagement, a screw 103 is threaded into coupling 99 for free sliding movement through a hole 104 provided centrally in contact cross-bar 90. A coil spring 105 encloses the shank of screw 103 in interposed relation to contact cross bar 90 and the head of said screw. An added function of spring 105 is to bias core plunger 89 and contact cross-bar 90 into open-circuit position.

Referring now in particular to the upper part of FIG. 10 and to FIGS. 12, 14 and 15, the timer 87 conventionally illustrated in FIG. 13 and its operation will now be described.

Timer 87 is a standard article of manufacture which may be adopted for appropriate functioning in any mechanism requiring it, such as our present time-controlled automatic circuit-opening means for the welding circuit and circuit-closing means for the warning indicator lamp.

It includes a stationary dial plate 107 of circular shape which is marked with an inner dial 108 and a concentric outer dial 109, both of which dials have registering graduations representing fractions of a second. The maximum range of both dials is six seconds with twelve minor subdivisions of five tenths of a second each.

Timer 87 is electrically operable and has a shaft 110 that rotates at predetermined speed from a pre-set starting position to a fixed stopping position when the electric circuit of the timer is closed by trigger switch 65 of welding gun 20. At the stopping position, the welding circuit will be opened automatically in a manner which will become apparent as the description progresses.

A manually adjustable arm 111 is rotatably mounted on timer shaft 110. Arm 111 is not turned about its pivotal axis by timer shaft 110. Instead, arm 111 is held in any desired pre-set position by firm frictional means associated with the casing of timer 87 and is provided with an outstanding stop lug 112 for limiting contact with a welding duration timing hand 113, which is affixed to shaft 110 for movement therewith when the timer circuit is energized. When the timer circuit is open, welding duration timing hand 113 will be backed up automatically by spring re-setting means forming part of the timer mechanism (not shown) until it is stopped in starting position by engagement with stop lug 112, wherever it may have been manually pre-set by the welder. To aid in precise pre-setting of welding duration timing hand 113, an index mark 114 is provided on said hand to traverse the graduated scale of inner dial 108. When hand 113 has reached the zero position on inner dial 108, timer 87 will automatically open microswitch 88 (FIG. 13) to cause opening of the timer circuit and of the welding circuit, and return of hand 113 to starting position in contact with stop lug 112.

An actuating hand 115 for warning indicator lamp 68 is frictionally secured to timer shaft 110 underneath dial plate 107 and has an L-shaped terminal pointer that extends outward through a slot 116 in said plate concentric to said shaft to traverse outer dial 109.

The visible pointer extremity of hand 115 has an index mark 117 that traverses the graduations of outer dial 109. The circuit 91—92 of warning indicator lamp 68 is controlled by micro-switch 93 (FIGS. 12, 13, 14 and 15) which is provided with a pivoted switch opening and closing lever 118 of Y-shape located in the path of movement of a U-shaped striker 119 on hand 115 of timer 87. Lever 118 presents horns or fingers 120 and 121, one of which will lie in the path of striker 119 in either tripped position of said lever (FIG. 14 or FIG. 15).

Properly performed, arc welding occupies two phases, viz.: (1) a forward-welding phase in which the tip of the welding rod is thrust forward into contact with the workpieces to be welded together; and (2) a backwelding phase in which the rod tip is withdrawn from the workpieces. During the forward-welding phase, the tip of the welding rod burns a hole in both workpieces and produces a globule of molten metal coming from the workpieces and the rod. In the back-welding phase, the molten metal is deposited in the burned out hole to form a "rivet" for fusion connection with both workpieces. Each phase consumes a given amount of time if the best results are to be obtained, and this varies with the skill and judgment of the welder. When relying upon his own sense of timing, even the most skilled welder cannot produce a number of successive welds that are identical in form and quality. That is why we claim to have contributed to the art of welding an improved gun and auxiliary apparatus which substitutes mechanical timing for human judgment of time.

The operation of our invention will now be described.

From previous experience as to the number of seconds of time usually required for perfect performance of each one of a series of identical welds, the welder will first pre-set stop arm 111 of timer 87 in such a fixed position that, when hand 113 is backed against the said stop arm by automatic spring action of the timer, hand 113 will be pre-set for the required number of seconds in advance of its zero position with reference to inner dial 108 for total welding time (forward-welding phase plus back-welding phase). Then, hand 115 is pre-set at the required number of seconds in advance of zero position to allow for the lighting of warning indicator lamp 68 at the proper time before the welding current is shut off to let the welder know just when to commence withdrawal of the welding rod in the back-welding phase.

Now, the equipment is all set for commencement of welding, so the welder manipulates welding gun 20 to place the arc shield type nose member 44 in contact with the exposed one of the workpieces to be united. By tipping or swaying nose member 44 and pressing the gun forward, the tip of welding rod 31 can be brought into view and directed toward the precise spot for commencement of the welding operation. Of course, this is done before trigger switch 65 is pressed to turn on the welding current.

When nose member 44 has been righted so that its front edge is in uniform contact with the exposed workpiece and the tip of welding rod 31 is known to be in arcing position, trigger 65 is pressed. This action shuts off the white workpiece-illuminating lamp 66 and closes the circuits of solenoid switch 78 and timer 87, so that welding current is now flowing through the welding circuit and the forward-weld phase is in progress. When hand 113 of timer 87 reaches its zero position, micro-switch 93 will be tripped to close the circuit of warning indicator red lamp 68. When the welder sees lamp 68 light up, he immediately commences to withdraw the tip of welding rod 31 from the workpieces. During this back-weld phase, spring 51 continues to maintain nose member 44 in contact with the workpieces and thereby prevents any injurious arc flash. Thereafter, at the precisely correct time, hand 115 of timer 87 will reach its zero position and micro-switch 88 will open the circuit of solenoid switch 78 and thereby open the welding circuit.

When the welder releases his finger pressure on trigger switch 65, white lamp 66 will light up again all ready to illuminate the workpieces. Hands 113 and 115 of timer 87 will become re-set in starting positions and the welder can proceed by repeating application of nose-member 44 and the tip of welding rod 31 to a new location to be welded and then again pressing trigger switch 65.

While the invention has been illustrated and described with respect to a few particular embodiments thereof, it will be understood that it is intended to cover all changes and modifications of the embodiments shown which do not constitute departures from the spirit of the invention and scope of the appended claims.

We claim:

1. An electric arc welding apparatus comprising: a welding gun including a casing having a handle, chuck means provided on the casing to mount a replaceable welding rod in forwardly projecting operative position, a workpiece-contacting nose member, supporting means to mount the nose member adjacent to the free tip of the welding rod for axial adjustment in relation to said rod, spring means tending to press the nose member forwardly away from the tip of the welding rod, a welding circuit including a first lead wire connected terminally to the chuck means, means to insulate the chuck means, welding rod and nose member from the casing, the welding circuit also including a second lead wire adapted to be connected to one of the workpieces to be welded and means to connect said circuit to a source of welding electric current; circuit closing means for the welding circuit, means by which the circuit closing means may be actuated to energize the welding circuit during a forward-welding phase in which the tip of the welding rod is pressed into arcing contact with the other workpiece and an immediately following back-welding phase in which the tip of the welding rod is withdrawn from said workpiece contact, a first timer device adapted to be pre-set to determine the duration of the closed condition of the circuit closing means for the welding circuit, warning indicator means, and a second timer device adapted to actuate the warning indicator means at a pre-set fraction of the total duration of the closed condition of said circuit closing means to indicate the moment at which the back-welding phase should commence.

2. The invention defined in claim 1, to which is added an extinguishable workpiece-illuminating light device mounted on the casing, controlling means for said light device, and means associated with said controlling means in a manner to turn the light on and off automatically before and after the welding circuit is closed.

3. The invention defined in claim 1, wherein the circuit closing means for the welding circuit includes a solenoid switch with a pair of insulated stationary contacts connected in series with said welding circuit, an electric coil, a plunger movable within said coil, a movable contact cross-bar connected to said plunger and adapted to be moved into circuit closing bridging contact with said stationary contacts when the circuit thereof is energized, and spring means biasing the movable contact cross-bar into open circuit position separated from the stationary contacts; a triggering circuit including the solenoid coil in a series connection, a normally open manually operable trigger switch connected in series with said triggering circuit; a normally open timing switch included in series with the triggering circuit, said first timer device being constructed and arranged to control said timing switch in a manner to permit pre-setting to determine the duration of closed condition of the welding circuit; said warning indicator means including an energizing circuit, and said second timer device being constructed and arranged to permit pre-setting to close the switch of said energizing circuit at a predetermined time at which the back-welding phase should commence.

4. The invention defined in claim 1, wherein the welding gun casing has aligned bearing holes in its walls and the supporting means to mount the nose member includes at least one guide rod slidable in said bearing holes; and wherein there is added braking means for the guide rod including a pressure member slidable in the casing for movement axially with respect to the guide rod and having a through hole through which said guide rod extends, said through hole having a flaring portion facing an adjacent casing wall; an elastic packing ring located in the flaring portion of said hole in the pressure member surrounding the guide rod; and means to adjust the pressure member in the direction of the said casing wall to wedge the packing ring radially against the guide rod with varying degrees of braking pressure.

5. The invention defined in claim 4, wherein there are two parallel guide rods penetrating relatively spaced bearing holes in the casing walls; wherein the pressure member is a bar having spaced through holes to receive said guide rods, said holes having flaring portions facing a casing wall; wherein a packing ring is located in the flaring portion of each through hole in the pressure bar surrounding the corresponding guide rod; and wherein the means to adjust the pressure bar in relation to the casing wall is a bolt connecting the central portion of said pressure bar to the casing wall.

6. The invention defined in claim 1, wherein the front and rear walls of the casing have aligned pairs of bearing holes; wherein the supporting means to mount the workpiece-contacting nose member is in the form of a pair of parallel guide rods slidably penetrating said bearing holes and includes a cross-head having a central axial bore, and a tubular shank provided on the nose member and being slidably engaged within said bore of the cross-head with sufficient clearance to permit the nose member to be tilted in said cross-head.

7. The invention defined in claim 6, wherein the nose member has a rearwardly facing shoulder; and wherein a compression spring is mounted on the shank of the nose member in interposed relation to said shoulder and the cross-head.

8. The invention defined in claim 7, wherein the cross-head includes a pair of ring sections having concave inner socket-forming faces; means to secure said ring sections detachably together; a ball joint ring confined between said ring sections of the cross-head and having a convex outer peripheral face in matching bearing contact with the concave socket-forming faces of said ring sections and being slidably mounted in enclosing relation to the shank of the nose member, whereby said nose member is mounted for tilting movement and axial sliding movement in relation to the cross-head.

9. In an electric arc welding gun, the combination of: a casing having a handle; chuck means provided on the casing to mount a replaceable welding rod in forwardly projecting operative position; a workpiece-contacting nose member; a pair of guide rods axially adjustable in the casing in relation to the said chuck means; a cross-head fixedly attached to the forward ends of the guide rods and having a central bore; the nose member having a rearwardly extending shank slidably engaged within said cross-head bore with sufficient clearance to permit the nose member to be tilted in said cross-head.

10. The invention defined in claim 9, wherein the nose member has a rearwardly facing shoulder; and wherein a compression spring is mounted on the shank of the nose member in interposed relation to said shoulder and the cross-head.

11. The invention defined in claim 10, wherein the cross-head includes a pair of ring sections having concave inner socket-forming faces; means to secure said ring sections detachably together; a ball joint ring confined between said ring sections of the cross-head and having a convex outer peripheral face in matching bearing contact with the socket-forming faces of said ring sections and being slidably mounted in enclosing relation to the shank of the nose member, whereby said nose member is mounted for tilting movement and axial sliding movement in relation to the cross-head.

References Cited in the file of this patent

UNITED STATES PATENTS

| | | |
|---|---|---|
| 1,815,611 | Brown | July 21, 1931 |
| 1,867,296 | Woodruff | July 12, 1932 |
| 2,550,495 | Pilia | Apr. 24, 1951 |
| 2,933,591 | Wojciak et al. | Apr. 19, 1960 |
| 2,950,381 | Brennen et al. | Aug. 23, 1960 |